United States Patent [19]

Grabowski et al.

[11] Patent Number: 5,373,219

[45] Date of Patent: * Dec. 13, 1994

[54] CONTROL SYSTEM FOR AN ELECTRICALLY PROPELLED TRACTION VEHICLE

[75] Inventors: Francis M. Grabowski, North East; Amy D. Duke; Frederick G. Beach, both of Erie, all of Pa.; James W. Nash, Portland, Oreg.; Paul H. Curtis, Waymart, Pa.

[73] Assignee: General Electric Company, Erie, Pa.

[*] Notice: The portion of the term of this patent subsequent to Jan. 18, 2011 has been disclaimed.

[21] Appl. No.: 29,845

[22] Filed: Mar. 11, 1993

Related U.S. Application Data

[63] Continuation-in-part of Ser. No. 860,786, Mar. 31, 1992, Pat. No. 5,280,223.

[51] Int. Cl.[5] .............................................. B60L 11/12
[52] U.S. Cl. ................................... 318/139; 180/65.4; 290/17; 290/14
[58] Field of Search ................. 318/34, 139, 432, 433, 318/434; 388/903, 907.5; 180/65.2, 65.3, 65.4, 65.5; 290/7, 8, 9, 10, 11, 14, 17, 21, 22, 24, 40 R, 40 A, 40 C, 45, 51

[56] References Cited

U.S. PATENT DOCUMENTS

| | | |
|---|---|---|
| 3,732,751 | 5/1973 | Berman et al. . |
| 4,482,813 | 11/1984 | Grand-Perret et al. . |
| 4,495,451 | 1/1985 | Barnard ............................. 318/150 |
| 4,634,887 | 1/1987 | Balch et al. .......................... 290/3 |
| 4,665,319 | 5/1987 | Seepe et al. ......................... 290/3 |
| 5,280,223 | 1/1994 | Grabowski et al. .............. 318/139 |

Primary Examiner—Bentsu Ro
Attorney, Agent, or Firm—R. Thomas Payne; Ann M. Kratz; Marvin Snyder

[57] ABSTRACT

A control system for an electrical propulsion system for a large wheeled vehicle adapted to haul a payload, the vehicle having an internal combustion engine and an electric generating means driven by the engine. The control system measures selected parameters and controls the engine and generating means to maximize output, and records historical operating data relating to the vehicle and its systems, and has a 2 digit display that provides information useful in troubleshooting problems.

42 Claims, 3 Drawing Sheets

CONTROL SYSTEM FOR AN ELECTRICALLY PROPELLED TRACTION VEHICLE

CROSS-REFERENCE TO RELATED APPLICATION

This application is a continuation-in-part of application Ser. No. 07/860,786, filed Mar. 31, 1992, now U.S. Pat. No. 5,280,223.

BACKGROUND OF THE INVENTION

The present invention generally relates to electric propulsion systems for traction vehicles, and more particularly, to a control system for such an electric propulsion system.

An electric propulsion system for a traction vehicle, such as a large haulage truck, often comprises a prime mover-driven electric generating means which supplies electric power to a pair of high horsepower electric traction motors that are respectively connected in driving relation to a pair of wheels located on opposite sides of the vehicle. The prime mover is generally a relatively large diesel engine and the traction motors are generally adjustable speed reversible direct current (d-c) electric motors. The operator of the vehicle controls the speed and direction of travel of the vehicle by manipulating one or more speed control pedals and a forward-reverse-neutral selector switch. An accelerator speed control pedal is adapted to control the diesel engine speed which determines the power output of the generating means to thereby vary the magnitude of the voltage applied to the traction motors.

A moving vehicle is decelerated by releasing the speed control pedal and either allowing the vehicle to coast or activating its mechanical or electrical braking system. In the electrical braking mode of operation, the motors function as generators and the magnitude of the voltage generated across the armature windings of each motor is proportional to the rotational speed and the field excitement current of the motor. Dynamic braking resistor grids are connected across the armatures of the respective motors to dissipate the electric power output of the motors during such electrical braking. The average magnitude of current in each resistor grid is a measure of the braking effect of the associated motor.

Such vehicles are most often employed in off the road environments, such as strip mines and the like which have terrain grades that can be severe, given the fact that the vehicles carry extremely large payloads. For obvious reasons, it is common to establish a maximum allowable propulsion speed for the vehicles and it has been conventional practice to include a preset overspeed limit in the controls of the propulsion system.

Several factors affect the selection of the speed limit. It cannot be higher than the maximum safe speed for entering any downhill grade of the roadway along which the vehicle will travel. The maximum safe entry speed is the highest constant speed that can be maintained on the downhill grade with the electrical retarding in effect. If the actual entry speed were higher than the maximum, the available dynamic retarding effort of the traction motors would be insufficient to keep the vehicle from accelerating into a runaway condition. The maximum retarding ability of d-c traction motors depends primarily on the commutation limit of the motors. Above the commutation limit, electrical arcs or sparks can occur with resulting damage to the motor commutator and brushes. The commutation limit is a function of the armature current magnitude multiplied by the armature velocity. At high speeds the current must be kept relatively low in order to avoid such arcing, thereby resulting in lower available dynamic retarding effect. If the available retarding effect were insufficient to slow the vehicle, service brakes could be used. However, at speeds above about 5 miles per hour, service brakes should not be used because such brakes rapidly wear at such speeds.

Even though the payloads carried by such vehicles is extremely large, it is desirable in terms of efficiency to have the vehicles travel as fast as is safely possible. When the vehicles are moving up a relatively steep grade, the maximum capacity of the diesel engine and the electric generating means is desirably used. This insures that the maximum speed is achieved.

Because of the expense of acquiring and maintaining such vehicles is substantial, it is also highly desirable to maximize the productivity of such vehicles and it is therefore desirable to have data relating to its history of operation of the vehicle to assist the owner-operator in evaluating the operation of the vehicles and to aid in the maintenance of them. Additionally, if a malfunction occurs in the operation of the vehicle, it is desirable to be able to troubleshoot the problem and perform corrective maintenance as well as preventative maintenance of the vehicle.

SUMMARY OF THE INVENTION

It is therefore a general object of the present invention to provide an improved control system for an electric propulsion system for traction vehicles, which has unique features and capabilities which contribute to reduced manufacturing costs, as well as reduced maintenance costs, by virtue of the control system having the capability of acquiring information and data which facilitates troubleshooting and maintenance operations.

Another general object of the present invention is to provide such an improved control system, which by virtue of its improved design, controls the electric propulsion in a manner which maximizes the output of the prime mover-driven electric propulsion system.

Still another general object of the present invention is to provide such an improved control system which uses measured parameters in such a way to increase the output of the electric generating means of the electric propulsion system in a manner which does not substantially increase the risk of damage to the electric generating means by operating above continuous rating limits.

Another object of the present invention is to provide an improved control system which automatically controls the diesel engine and electric generating means in a manner which automatically utilizes the maximum horsepower capacity of the diesel engine at any given time when maximum horsepower can be desirably utilized.

Yet another object of the present invention is to provide such an improved control system which includes processing means and memory means in which historical operating and status data can be stored for the purpose of providing reports relating to the operation of the vehicle, Still another object of the present invention lies in the provision of providing historical data relating to the operation of the vehicle which can be extremely useful in evaluating the productivity of the vehicle as well as detecting improper operation and perhaps abuse of the vehicle by a driver.

Another object of the present invention is to provide such an improved control system which records in the memory means of the processing means specific information relating to the electrical parameters of the electric propulsion system and mechanical parameters of the vehicle and diesel engine in a manner whereby time logs of various types of operating conditions are maintained. A related object lies in the provision of having reports relating to such time logs generated on a daily basis, as well as for the two preceding three month periods.

Still another object of the present invention is to provide such an improved control system which includes a display means which can be located in the cabin of the vehicle and which provides a visual readout of various status conditions of the vehicle, the electrical generating means as well as the diesel engine.

A more specific object lies in the provision of having a plurality of two digit codes which identify specific status conditions, including fault conditions, relating to the operation of the diesel engine, the electric generating means and the vehicle.

Other objects and advantages of the present invention will become apparent upon reading the following detailed description, while referring to the attached drawings, in which.

DETAILED DESCRIPTION

Broadly stated, the present invention is directed to a control system for an electric propulsion system for an electrically propelled traction vehicle such as a large off-highway haulage truck. The control system includes a central processing unit with associated memory coupled with analog input and output boards, as well as digital input and output boards for receiving signals that are indicative of various operating conditions of the electrical propulsion system and for transmitting control signals thereto. The control system has significant and substantial control capabilities compared to prior control systems comprised essentially of hardwired circuits.

Among the considerable features and advantages of the control system embodying the present invention, is the capability of operating the prime mover, preferably a diesel engine, and the electric generating means, preferably an alternator, in a manner whereby optimum horsepower output is produced. This results in the vehicle having the capability of operating at optimum efficiency consistent with temperature and other constraints and increases the productivity of the vehicle. Moreover, the control system has the capability of maintaining records relating to the operation of the diesel engine, the alternator and the vehicle for recording operating times which are useful in determining the productivity of the vehicle and for both preventative and corrective maintenance programs.

The data that is maintained is adapted to provide a number of quarterly reports as well as daily reports for use by the owner/operator of the vehicle. Moreover, such recorded information is also useful in determining whether drivers of the vehicle are negligently operating the vehicle or even abusing the same and enables the owner/operator to take corrective action if the data indicates that it is needed. The control system has a display which is extremely useful in performing troubleshooting, and status conditions are displayed in the form of two-digit codes which in many cases identifies a fault condition. Use of the displayed code in combination with a manual can often quickly reveal the cause of the fault condition.

Figure 1:
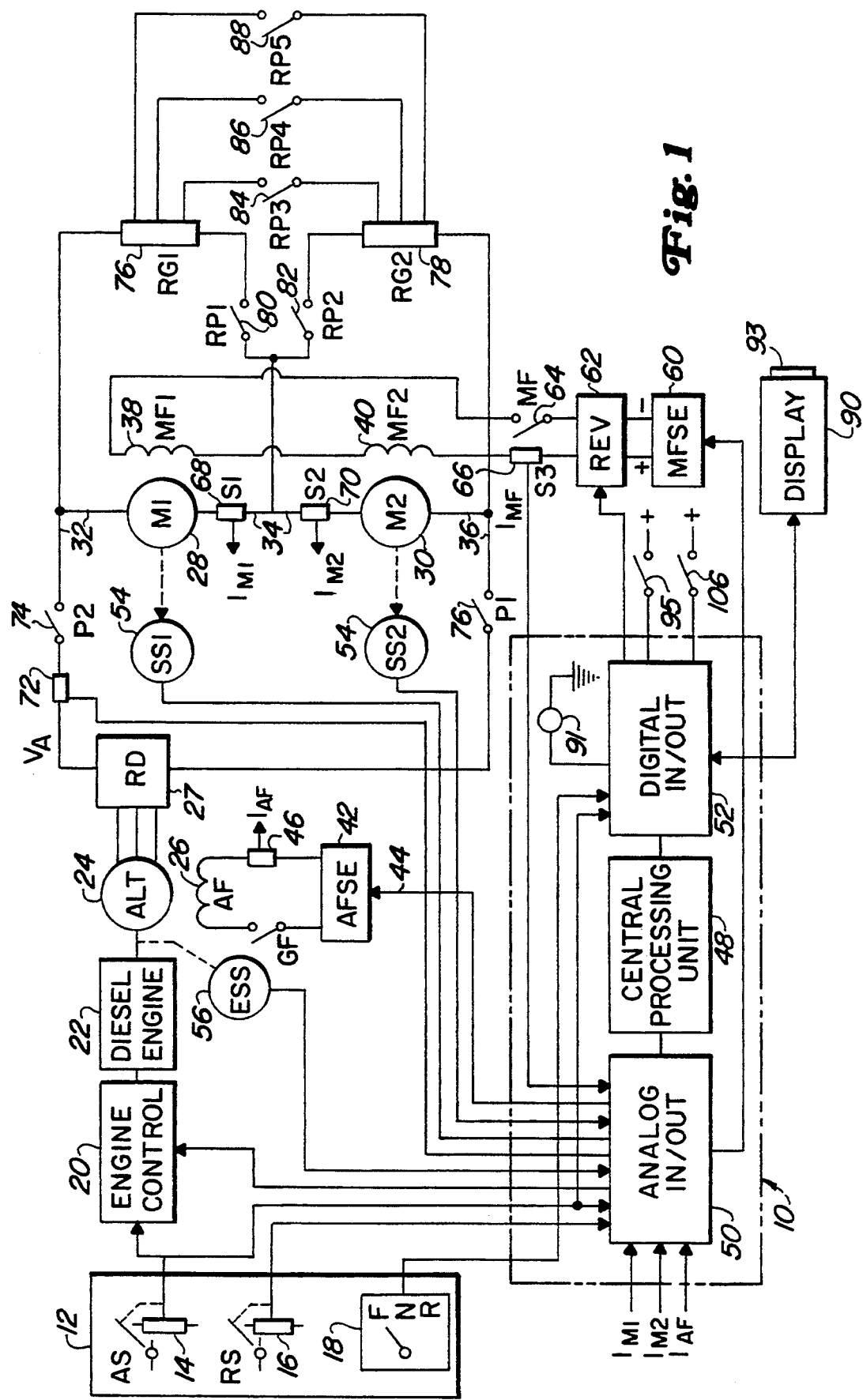
FIG. 1 is a functional block diagram of an exemplary control system for the electric propulsion system for an electric traction vehicle.

Turning now to the drawings, an exemplary electric propulsion system is shown in FIG. 1, together with the control system indicated generally at 10. The vehicle includes driver controls located within the box 12 and includes an accelerator pedal 14, a retard pedal 16 and a forward-neutral-reverse selection switch 18. The accelerator pedal 14 is connected to an engine control means 20 which controls the speed of operation of a diesel engine 22.

The accelerator pedal 14 is adapted to be depressed by the driver and at least partially controls the engine control module 20 and also sends signals to the controller 10. At zero pedal depression, the engine operates at its low idle speed of approximately 750 rpm. At maximum pedal depression, the engine will be operating at preferably 1900 rpm. When the pedal is initially depressed, a digital signal identified as "AS" is sent to the control system 10 causing it to set up in the propulsion mode. This pedal also sends an analog signal proportional to its depression to the engine control module 20 that varies the speed of the engine from 750 to 900 rpm. The control system 10 is also adapted to apply either a high or low idle speed from the control system 10 in addition to the variable speed provided by the pedal 14.

The retard pedal 16 is a separate pedal from the accelerator pedal and when the driver pushes this pedal, the system is placed in the retard or electrical braking mode. When the pedal is depressed, a digital signal called RS is sent to the control system 10 causing it to set up in the retard mode. The engine will then be caused to operate in the high idle speed of approximately 1650 rpm whenever this pedal is depressed. An output from the control system to the engine control module 20 establishes this condition. An analog signal called "retard in" is also supplied from this pedal to the control system 10 and its value is proportional to the amount the pedal is depressed.

The selector switch 18 is used by the driver to select either the forward, neutral or reverse conditions. The control system 10 then changes the direction of current flow in the motor field windings of the motors 28 and 30 and thereby specifies the direction of rotation of the motors and therefore the direction in which the truck is moved.

The output shaft of the diesel engine 22 is drivingly coupled to the rotor of an alternating current (a-c) generator 24, hereinafter referred to as an alternator, which has a set of 3-phase main windings (not shown), a pair of auxiliary or tertiary windings (not shown), and field winding 26. The 3-phase generally sinusoidal alternating voltage that is generated in the main windings of the alternator 24 is converted to direct voltage by means of a rectifier diode panel 27.

The diesel engine-driven alternator 24 serves as a source of energization for a pair of adjustable speed d-c traction motors 28 and 30, whose respective armature windings are connected via lines 32, 34 and 36, in series with one another between the output terminals of the rectifier diode panel 27. The motors 28 and 30 have separately excited field windings 38 and 40, respectively. The rotors of these motors are respectively coupled through the suitable speed reduction gearing to a pair of wheels (not shown) located on opposite sides of the vehicle. By suitably controlling the speed of the engine 22 and the excitation of the alternator and motor fields, the vehicle can be propelled (also known as "motoring") or dynamically retarded (also known as "electrical braking") by its motors in either a forward or reverse direction.

Each of the motors 28 and 30 have an associated speed sensor 54 which is preferably a reluctance type magnetic sensor that measures the armature speed by counting gear teeth on the armature shaft. The speed feedback is applied to the analog input/output board 50 of the control system 10. The speed sensor is used by the control system 10 to control the retard speed control function, the speed override and overspeed function, the control of the park brake and the control of the reverser as well as other functional operations.

During the motoring mode of operation, the motors 28 and 30 will each rotate at a speed that depends on both the magnitude of excitation current in the fields 38 and 40 and the magnitude of the voltage applied to the respective armature windings. The latter magnitude is a function of both the speed at which the alternator 24 is driven and the magnitude of the excitation current in the alternator field winding 26. The alternator field excitation current is supplied to an alternator field winding 26 by the auxiliary winding (not shown) of the alternator 24 by an alternator field static exciter panel 42. This panel controls the amount of excitation current supplied to the alternator field in response to an analog signal on line 44 that is generated by the control system 10. The panel comprises diodes and silicon controlled rectifiers (SCR's). The power for this panel is supplied by an auxiliary winding called a tertiary winding located in the alternator and is not shown in FIG. 1.

The alternating field is a rotor winding of the alternator and the amount of d-c excitation current applied to this winding controls the amount of voltage and current that are produced on the main 3-phase output. By controlling the $I_{AF}$, the amount of electrical power applied to the motors can be varied from zero to maximum. This current is applied through slip rings (not shown) since this winding is rotating at engine speed. A shunt 46 provides a $I_{AF}$ feedback signal that is provided to the control system 10 during operation. The shunt 46 is preferably a 400 amp. 100 millivolts shunt.

The motors 28 and 30 are often referred to in the art as motorized wheels and comprise a d-c motor, gear box and vehicle rear axle that is integrated into a single package called a motorized wheel. The motorized wheel is bolted to the rear axle box structure of the truck. Rims and dual tires are attached to each motorized wheel and the armature shaft is coupled to the tire through the compound gear reduction mechanism. Service brakes and park brakes are generally supplied and act on the motor armature shaft on certain trucks. The control system 10 is comprised of a CPU 48 having associated memory, as well as an analog input/output board 50 and one or more digital input/output boards 52. The analog input/output board 50 preferably includes counters which effectively convert selected speed related analog pulses to a digital value which can be processed by the CPU 48. The CPU is preferably a Model 80960KB microprocessor integrated circuit manufactured by Intel Corporation and the associated memory preferably comprises a 1 megabyte memory in which the program resides.

The speed of the diesel engine 22 is also sensed by an engine speed sensor 56 which is preferably a reluctance type magnetic sensor that measures the speed/engine/alternator speed by counting gear teeth on a gear in the alternator 24 and this signal is also applied to the analog input/output module 50.

The current supplied to the motor fields 38 and 40 originate from a motor field static exciter 60 which is connected to a reverser 62 that controls the direction of current that is applied to the motor field windings. The motor field static exciter is a solid-state phase controlled bridge that utilizes diodes and SCR's to vary the amount of current supplied to the motor fields as determined by motor field commands provided by the analog input/output module 50 and which originate from the central processing unit 48. The reverser 62 is a bi-stable switch that reverses the direction of current flow through the motor fields and thereby controls the direction in which the vehicle will move. The reverser 62 is controlled by the CPU 48 via the digital input/output module 52.

A motor field contactor 64 is provided and this contactor sets up the field circuit which allows current to flow from the motor field static exciter 60. The contactor 64 is closed in the propulsion and retarding modes of operation, but is open in the neutral mode. It is controlled by the CPU 48 via the digital input/output module 52. A shunt 66, preferably a 400 amp. 100 millivolts shunt, provides the $I_{MF}$ feedback signal that is indicative of the motor field current and the signal is applied to the analog input/output module 50. Each of the motors 28 and 30 has respective shunts 68 and 70 which are preferably 1000 amp. 100 millivolts shunts that provide a signal that is indicative of the motor current in the respective motors and this signal is applied to the analog input/output module 50.

A voltage sensor 72 is provided in line 32 to measure the output voltage of the rectifier diode panel 27 and contactors 74 and 76 are also provided and are closed in the propulsion mode and opened in the retarding mode. Each of these contactors, as well as all other contactors in FIG. 1, also has a position sensor that gives a digital feedback to the control system 10 to indicate whether it is opened or closed.

When the control system 10 places the vehicle in the retard mode, the contactors 74 and 76 are opened and the motors 28 and 30 function as generators. When this is done, resistance grids 76 and 78, which are high power banks of forced air cool resistors used to dissipate the energy created by the motors acting as generators in the retarding mode, are placed in circuit by the contactors 80 and 82. When the vehicle is in the retarding mode, the contactors 80 and 82 are closed, but are opened in the propulsion mode. The resistor grid is preferably comprised of 4 to 10 resistors and additional contactors 84, 86 and 88, which are controlled by the CPU 48 via the digital input/output module 52 and which are controlled to close at unique values motor speed.

These latter contactors provide extended range retardation and function to reduce the value of the resistance in the resistor grids 76 and 78 down to low vehicle speeds. As the vehicle and motors slow, the amount of voltage produced by the motors acting as generators falls and therefore the same level of retarding current must be maintained by reducing the resistance of the load. The control of the contactors is such that they are sequentially closed as a function of the motor speed. Additional contactors may be provided in addition to the three contactors 84, 86 and 88.

A display 90 is also connected to the digital input/output module 52 and it provides information relating to the status of the operation of the vehicle and of the control system 10.

Figure 2:
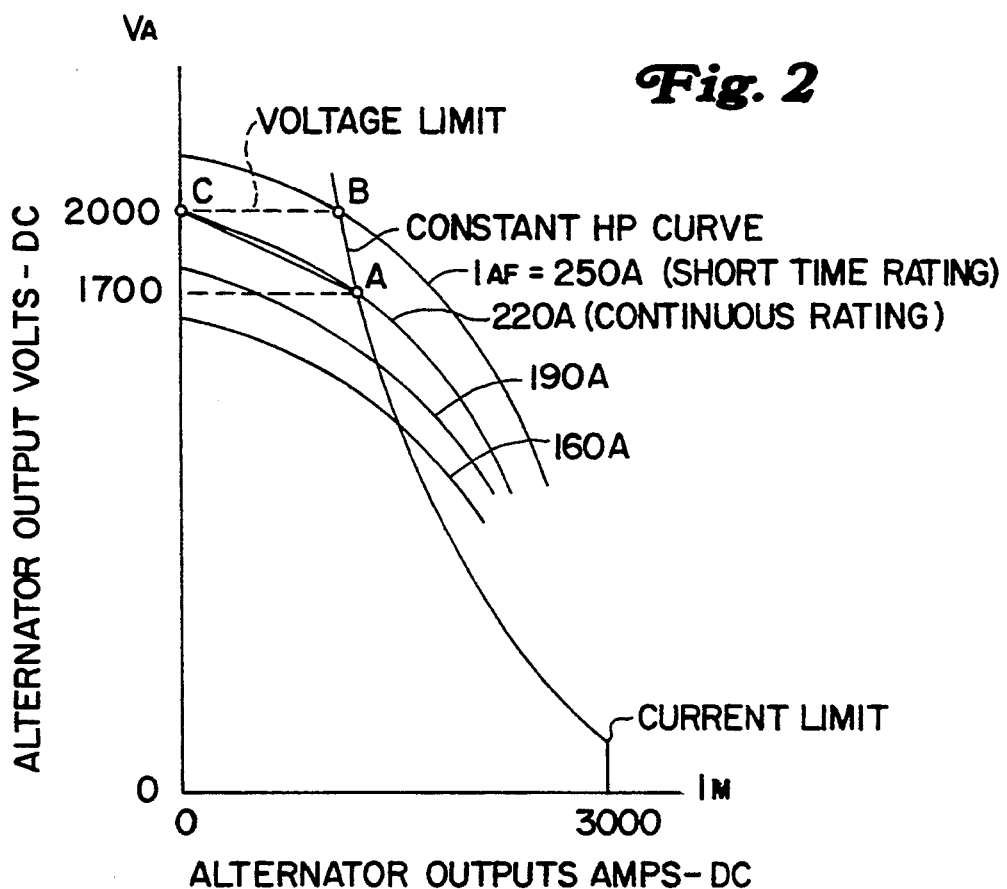
FIG. 2 is a graph of alternator current versus voltage and particularly illustrating the operation of the thermal simulator feature of the present invention.

In accordance with an important aspect of the present invention, there are times during the operation of the vehicle where increased truck performance is very desirable, such as traversing a relatively steep grade for a relatively short time. During operation, an electric drive vehicle can only utilize the full horsepower available from the engine over a limited range that is commonly referred to as the constant horsepower region. Referring to FIG. 2, there is a graph of the alternator output amp versus the alternator output voltage and a constant horsepower curve is shown and identified. As the vehicle accelerates from a stop toward full speed, the voltage produced by the alternator increases. To make this voltage increase, the current applied to the alternator rotor ($I_{AF}$) must also increase. In prior art vehicles, the control system has generally been operated to allow $I_{AF}$ to increase to its continuous rating, shown to be 220 amps in FIG. 2, which is the maximum value of $I_{AF}$ that can be applied continuously without exceeding the rotor temperature limit as determined by the type of insulation used in the rotor and other factors. This point is called the upper corner point in the art and the electrical system can no longer continue to increase the alternator voltage and remain on the constant horsepower curve.

In operation, the voltage limit control of such prior control systems causes the output voltage to follow from points A to C, with the latter move resulting in the full engine horsepower not being utilized because point C is not on the constant horsepower curve. It is also well known that alternators have a short time rating during which operation can be carried out above the continuous rating for a short period of time. By utilization of the alternator short time ratings as described in this invention, the voltage can follow the points A to B which utilize full engine horsepower up to 2000 V d-c. The amount of time is inherently a function of the operating conditions and the load being placed on the alternator, as well as heat transfer and storage characteristics of the alternator, the electrical resistance of the rotor and the operating speed of the engine.

The important consideration is the temperature of the rotor of the alternator, and it should be readily appreciated that when the alternator is operated in the short time rating, the temperature of the rotor will necessarily increase. As should also be readily understood, the alternator cannot operate indefinitely in the short time rating or the rotor will become overheated and damage would inevitably result.

In accordance with an important aspect of the present invention, the control system utilizes known characteristics and measured electrical parameters to estimate the rotor temperature, since it cannot be effectively directly measured, by running a computer simulation of the rotor temperature which is calculated at predetermined time intervals, such as preferably every five seconds. The computer simulation takes into consideration the surface heat transfer coefficient of the alternator which is a function of the engine speed. Thus, different coefficient values are preferably used including values corresponding to the rated engine speed, the high idle speed and the low idle speed. The heat storage capacity of the alternator is a value that is available empirically as is the resistance of the rotor at a particular temperature. Using this data plus the ambient temperature and the current flowing through the rotor, the temperature rise of the alternator can be accurately simulated and the control system operates to have the alternator run in the short time rating until the temperature reaches a predetermined maximum temperature. At that point, the control system reduces the alternator to its continuous rating value.

The temperature rise of the rotor is calculated based upon the following finite difference equation:

$$1T_{sim} = T^*\left(1 - \frac{H\Delta t}{C}\right) + \left(\frac{I_{AF}^2 R(234.5 + T_{amb} + T)}{259.5^*C}\right)$$

where
T = temperature rise of rotor (°C.),
$\Delta t$ = Time step,
H = Surface heat transfer coefficient (Watts/C),
C = Heat storage capacity (watt-sec-/°C.),
R = Resistance of rotor (ohms),
I = RMS amps during $\Delta t$, and
$T_{amb}$ = Ambient temperature (°C.).
Utilizing this implemented equation, when the temperature rise plus the ambient temperature is reached, preferably at a value of approximately 220° C., the control system will reduce the current from the short term rating to the continuous rating.

In accordance with another important aspect of the present invention, it is important to utilize the full horsepower capacity of the diesel engine to maximize production for reasons that have been hereinbefore described. Prior control systems have typically utilized a maximum horsepower rating for an engine which is set in the control system and which is not exceeded under any conditions.

Figure 3:
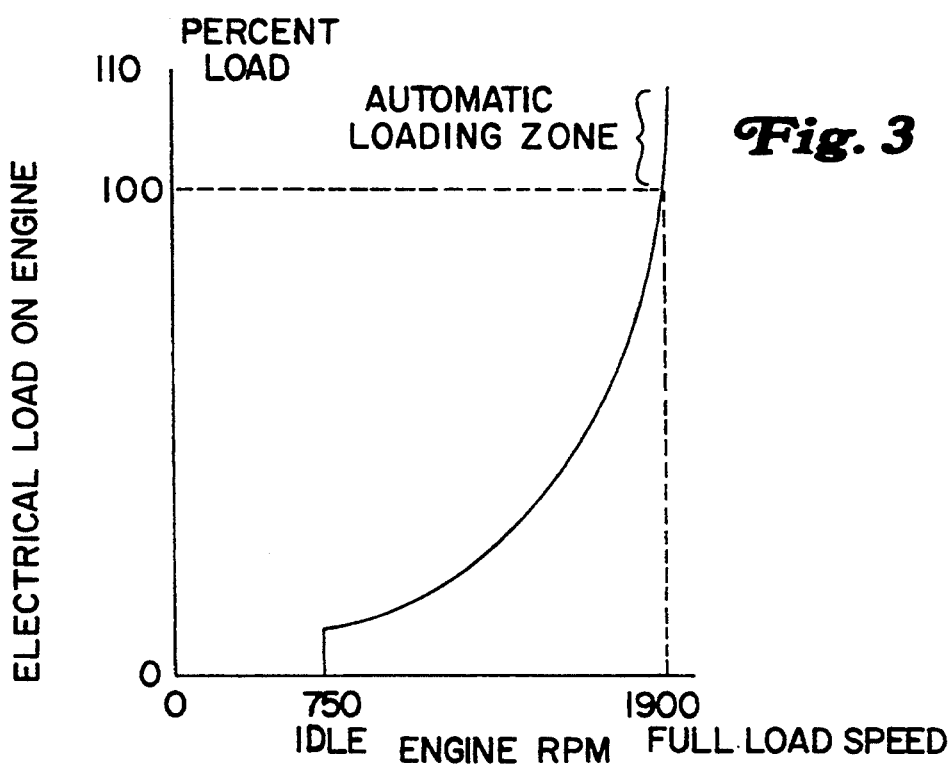
FIG. 3 is a graph illustrating the prime mover or engine speed versus electrical load on the engine and particularly illustrating the automatic loading feature of the present invention.

Referring to FIG. 3, there is a graph of engine speed versus electrical load on the engine and this graph is generated by measuring the electrical load presented by the alternator on the engine as a function of the engine rpm as measured by the speed sensor 56 of FIG. 1. The graph is developed to optimize the criteria of the engine capability as a function of rpm, the driver acceptability as it relates to the driver's ability to control the vehicle under all modes of operation and the best utilization of fuel. Prior control systems typically have had a manual mode of HP loading, where the vehicle is put into a self-load or a load box mode. The braking resistor grids 76 and 78 are reconnected to the output of the alternator and used to load the engine while the truck is stationary. The procedure results in a fixed value which is stored in the control and is thereafter used, and is identified as point A on the graph shown in FIG. 3.

However, in accordance with the important aspect of the present invention, the control system can also operate in an automatic mode which operates to increase the load on the engine thereby producing additional horsepower until the diesel engine speed starts to fall below its rated full load speed. By doing this, the maximum amount of horsepower that the engine can deliver is used. While each engine has a rated horsepower, it is typical for the horsepower to be plus or minus five percent from the rating under favorable temperature and altitude conditions. Under unfavorable conditions, such as high altitude or dirty fuel filters and the like, the engine may not be capable or producing the rated horsepower. When the control system operates in the automatic loading feature, the vehicle will be taking advantage of whatever the capacity of the engine is at a particular point in time and may have the effect of making the vehicle more productive by increasing the truck speed on uphill grades if the engine has additional capacity for example. The automatic mode is relatively easily implemented, and requires only the engine speed signal from the speed sensor 56 as an input signal to the central processing means. When the speed falls below a predetermined value, the processing means reduces the alternator load being applied to the diesel engine.

In accordance with yet another important aspect of the present invention, the central processing unit 48, together with its associated memory, are adapted to receive the various signals relating to the operation of the diesel engine 22, the alternator 24 and the vehicle itself, and this information is selectively stored in the memory and provides a database of information which can be used to generate reports that are extremely useful for management and maintenance people in monitoring the operation of the truck.

Such statistical data reports can be advantageously used to determine truck productivity and can therefore determine what percentage of the time the vehicle is doing useful work. Also, the statistical data can determine the severity of duty of the vehicle, since horsepower, amperes and motor temperatures are measured and from that the determination of the severity of the duty cycle of the vehicle can be made. This would enable management of a mine, for example, to gather information for future planning, i.e., whether a larger diesel engine may be required or a different gear ratio needed to optimize performance.

Such statistical data also can be helpful in administering warranty requirements may enable the manufacturer to determine whether a component failure was the result of a manufacturing defect, driver abuse or poor maintenance. Additionally, preventive maintenance can be more reliably scheduled depending upon the duty cycle or changes in the duty cycle of the vehicle. For example, if the rate of logged mileage on the vehicle changes drastically, the oil change interval might be accordingly changed. If the average motor temperature increases, it may be desirable to check the cooling blower and air ducts for possible damage. Additionally, abnormal operating conditions, such as driving the vehicle with the brakes applied, or an excessive number of vehicle overspeeds and the like, is readily discoverable with the data that is maintained. Finally, a historical record for each vehicle can be maintained.

The central processing unit 48 stores the received data in queues that are preferably periodically reset according to unique rules. Among the queues are a lifetime queue which is not automatically reset so that data collected from the time the system is started until a manual reset is invoked is maintained. This queue provides a life history of each vehicle. A second queue is a this day queue which is automatically reset at the end of each day. It gives a daily history of what happened to the vehicle during the day. Another queue is a this quarter queue which is reset at the end of each three month period and gives a quarterly history which must be read before the end of the quarter. The central processing unit also maintains in its memory a last quarter queue which is reset at the start of a new quarter. It shows what took place during the previous quarter. Finally, certain statistical data is maintained in a manufacturer queue which contains two lifetime queues that have been described, and this is preferably capable of only being read or reset by manufacturing personnel. The report is tied to a particular vehicle with particular components. The serial numbers of the vehicle, the diesel engine, motors, alternator, etc. are given in the report. The lapsed time that the report covers from start date to finish date are also given.

More specifically, the statistical data that is recorded includes operating hour monitoring of the diesel engine 22, the motors 28 and 30, the alternator 24, the propulsion mode, retarding mode, coast mode, idle mode, fault down time and the total truck. Parameter counters record events, including some which are time stamped and such events include those of overspeed, dump body switch operation, dump body override switch operation, service brake application, body load switch operation, selector switch operation above three miles per hour, engine started, accelerator pedal 14 and service brake pushed at the same time, the accelerator pedal and park brake applied at the same time, retard switch 16 and service brake pushed at the same time, the speed being greater than 0.3 mph and the part brake applied, speed override and reverser 62 operation. Other events also include the two digit display 90 reset pushed, the accelerator pedal 14 and retarding pedal 16 pushed at the same time, the selector switch being changed, the vehicle operating mode being changed among the propulsion, retarding and coast modes, the pick-up and drop-out of various contactors, the accelerator pedal 14 being pushed with the motor temperature above 220° C. and the retard pedal 16 being pushed at zero speed. While other events may be recorded, the above described events are representative of the kinds of events that are preferably recorded in memory.

Moreover, parameter profiles are maintained which include the propulsion and retarding mode of operation, the motors 28 and 30 armature currents and temperatures and motor field current, as are the net input horsepower, the engine speed, the vehicle speed and the distance traveled.

All of this information can be used for preparing extremely comprehensive statistical data reports that can be used by management and/or maintenance personnel.

Figure 4:
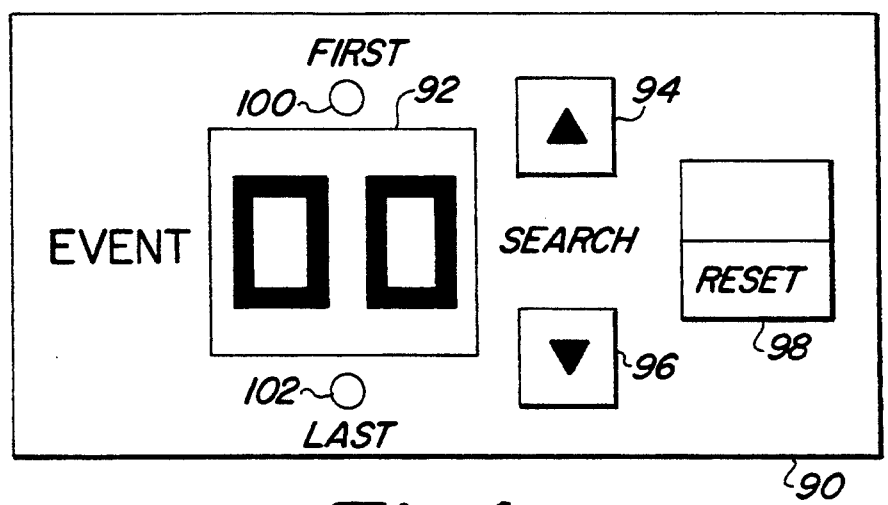
FIG. 4 is a front view of the display panel of the present invention.
Figure 5:
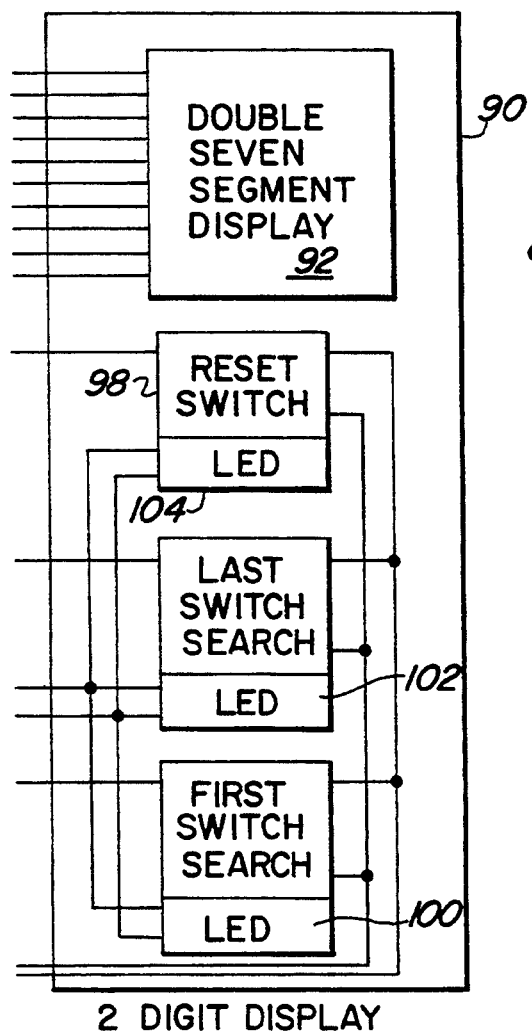
FIG. 5 is an electrical schematic diagram of the display illustrated in FIG. 4.

In accordance with yet another aspect of the present invention, and as previously mentioned, the system includes the display 90 shown in FIG. 1, which is also illustrated in detail in FIGS. 4 and 5. The display 90 has a two digit display readout 92 which provides diagnostic information to the driver of the vehicle and the display panel also includes up and down search buttons 94 and 96, respectively, as well as a reset button 98. LED indicators 100 and 102 are also provided to indicate the first and last display codes that are current. The reset switch 98 also has an associated LED 104. The display 90 provides a two digit display which identifies various problems by a fault code number. If a problem arises, there may be a number of faults that result, in which case, several codes may be generated. By using the search buttons 94 and 96, these codes may be viewed by scrolling through the active codes. Depending upon the particular fault, the code may be maintained for a preselected time period after it occurs.

In a preferred embodiment of the present invention, associated with each code on the two digit display provided by display 90 is a short description of troubleshooting techniques. This description or help text is activated using a portable test unit (PTU), such as a laptop or portable computer, to view event data saved when the respective codes occur. For example, the F1 function key on a keyboard provides help on any screen in the PTU. While the PTU is being used to view event data, the F1 key activates the troubleshooting help text for the two digit display code. Thus, whatever the event code, use of the F1 key brings up the appropriate troubleshooting help screen. These context sensitive help screens allow the operator to apply troubleshooting techniques specifically directed to the event data. In addition, an on-line glossary can be provided to help the troubleshooter understand the terms on the screen.

Alternatively, a troubleshooting guide which described all fault codes may be provided, along with a chart which gives a brief explanation of the codes and possible causes of the faults. A description of the various two digit display panel codes are set forth in Appendix A which is attached hereto. Each code identifies the condition associated with the code number, and an indication of the possible cause, and the time period for which the code is maintained.

As an additional troubleshooting aid in a preferred embodiment of the present invention, two PTU screens illustrating the necessary signals to achieve acceleration and retard sequence, respectively, may be created. These screens contain ladder diagrams which use backlighting to enable repair personnel to determine which signal is preventing the control system from achieving the accel or retard state, and the corresponding contactor sequence. The logic diagrams preferably include operator inputs as well as propulsion system feedbacks. Because the logic screens run in "real-time", as a signal is fixed, the logic screen display is updated. This updating allows the troubleshooter to test grounding or powering points in the signal paths and immediately determine whether the change being tested is a fix for the problem.

In accordance with another important aspect of the present invention, and referring to Appendix A generally, the events that occur not only result in the generation of a 2 digit code, but the event is also recorded in the memory associated with the CPU 48. The operator of the vehicle has the capability of overriding a number of fault conditions during propulsion of the vehicle for a predetermined number of times, depending upon the particular condition. It should be understood that the occurrence of a fault condition during the propulsion mode of operation results in the CPU 48 generating a command to the main contactors 74 and 76 which causes them to open, which results in the vehicle being stopped. Once it has stopped, the operator can operate the override switch to attempt to continue operation. If the vehicle is in the retard mode where braking may be essential to preclude a runaway condition from occurring, the processing means will not open contactors 80 and 82, for to do so may cause such a runaway condition. The decay time period also functions to define the period during which the override limit is effective.

The override is done by the operator by depressing a switch 95 that is located in the cab of the vehicle. However, each fault has a limit constraining the further overriding of the fault condition. Once this limit has been reached, further overrides are disallowed, the vehicle is shut down and maintenance personnel must inspect the vehicle and either correct the problem or perform a reset from the 2-digit display. As shown in Appendix A, event 01, for example, which is for a low level ground fault, it can be reset up to four occurrences of the fault, but event 02, relating to a high level ground fault, cannot be reset, because it is a dangerous fault condition.

The display 90 also has a connector 93 into which a portable test unit, preferably a portable laptop or smaller computer (not shown), can be connected for the purpose of obtaining data and information from the memory of the CPU 48, including the displayed information that may have been removed from the display 90 in response to the reset switch 98 operation. Such an operation only removes the codes from the display 90, and the information is still maintained in the memory of the CPU 48, and may be accessed by the portable test unit if desired.

As previously described, the sampling is preferably performed every 0.01 seconds, but can be adjusted preferably within the range of about 0.01 seconds to 1 second by the operator. If the sampling is done more infrequently, there may be a need to gather data more often, and the system includes a switch 106 which enables a "snapshot" of gathered data at each operation of the switch 106. This corresponds to the code 98 shown in Appendix A.

The event values shown in Appendix A also include as acceptance limit value, which is an indication of the number of such events that can be recorded in memory before the oldest events of the particular type are overwritten. A window limit is also provided, which is a higher priority writing of the same data and which is not overwritten by events written in the acceptance limit allocation of the memory.

While various embodiments of the present invention have been shown and described, it should be understood that various alternatives, substitutions and equivalents can be used, and the present invention should only be limited by the claims and equivalents thereof.

Various features of the present invention are set forth in the following claims.

| | TWO-DIGIT DISPLAY PANEL CODES | | |
|---|---|---|---|
| EVENT DESCRIPTION | EVENT RESTRICTIONS (IF ANY) | DETECTION INFORMATION | EVENT VALUES |
| 00 - Reset All | Not Displayed | Used to reset all events | |
| 01 - Low Level Ground Fault | System Fault<br>In Accel: Shut down truck and turn on SYSFLT light.<br>In Retard: Turn on SYSFLT light | A ground fault is detected if leakage current to ground (truck body) exceeds 114 ma. There is a 0.2 second delay on shutdown. In the | Decay Time 1800<br>Lock Limit 5<br>Accept Limit 20<br>#Window Limit 5 |

-continued

TWO-DIGIT DISPLAY PANEL CODES

| EVENT DESCRIPTION | EVENT RESTRICTIONS (IF ANY) | DETECTION INFORMATION | EVENT VALUES |
|---|---|---|---|
| | only.<br>All events are recorded in memory. | following order, check for moisture in motors, grids and power cables, motor flash, insulation failure in power circuit, bad FB102 card. | |
| 02 - High Level Ground Fault | System Fault | A ground fault is detected if leakage current to ground (truck body) exceeds 140 ma. There is a 0.05 second delay on shutdown. Same as No. 01. | Decay Time NA<br>Lock Limit 1<br>Accept Limit 1<br>#Window Limit 1 |
| 03 - Ground Test | System Fault | Reset Fault - Tripped During Testing. | Decay Time<br>Lock Limit<br>Accept Limit<br>#Window Limit |
| 10 - GF Contactor | System Fault | GF contactor command and feedback don't agree. In the following order, check for welded tips, blocked armature, defective coil or position sensor, loose connections to coil or position sensor, mechanical obstruction which prevents smooth operation, bad FB104 card. | Decay Time 3600<br>Lock Limit 3<br>Accept Limit 10<br>#Window Limit 2 |
| 11 - GFR relay | System Fault | GFR relay command and feedback don't agree. Same as No. 10. | Decay Time NA<br>Lock Limit 1<br>Accept Limit 20<br>#Window Limit 5 |
| 12 - MF Contactor | System Fault | MF contactor command and feedback don't agree. Same as No. 10. | Decay Time 3600<br>Lock Limit 3<br>Accept Limit 10<br>#Window Limit 2 |
| 13 - P1 Contactor | System Fault | P1 contactor command and feedback don't agree. Same as No. 10. | Decay Time 3600<br>Lock Limit 3<br>Accept Limit 10<br>#Window Limit 2 |
| 14 - P2 Contactor | System Fault | P2 contactor command and feedback don't agree. Same as No. 10. | Decay Time 3600<br>Lock Limit 3<br>Accept Limit 10<br>#Window Limit 2 |
| 15 - RF1 Contacter | System Fault | RF1 contactor command and feedback don't agree. Same as No. 10. Series only. | Decay Time<br>Lock Limit<br>Accept Limit<br>#Window Limit |
| 16 - RF2 Contactor | System Fault | RF2 contactor command and feedback don't agree. Same as No. 10. Series only. | Decay Time<br>Lock Limit<br>Accept Limit<br>#Window Limit |
| 17 - RP1 Contactor | System Fault | RP1 contactor command and feedback don't agree. Same as No. 10. | Decay Time 3600<br>Lock Limit 3<br>Accept Limit 10<br>#Window Limit 2 |
| 18 - RP2 Contactor | System Fault | RP2 contactor command and feedback don't agree. Same as No. 10. | Decay Time 3600<br>Lock Limit 3<br>Accept Limit 10<br>#Window Limit 2 |
| 19 - RP3 Contactor | System Fault | RP3 contactor command and feedback don't agree. Some as No. 10. | Decay Time 3600<br>Look Limit 3<br>Accept Limit 10<br>#Window Limit 2 |
| 20 - RP4 Contactor | System Fault | RP4 contactor command and feedback don't agree. Same as No. 10. | Decay Time 3600<br>Lock Limit 3<br>Accept Limit 10<br>#Window Limit 2 |
| 21 - RP5 Contactor | System Fault | RP5 contactor command and feedback don't agree. Same as No. 10. | Decay Time 3600<br>Lock Limit 3<br>Accept Limit 10<br>#Window Limit 2 |
| 22 - RP6 Contactor | System Fault | RP6 contactor command and feedback don't agree. Same as No. 10. | Decay Time 3600<br>Lock Limit 3<br>Accept Limit 10<br>#Window Limit 2 |
| 23 - RP7 Contactor | System Fault | RP7 contactor command and feedback don't agree. Same as No. 10. | Decay Time 3600<br>Lock Limit 3<br>Accept Limit 10<br>#Window Limit 2 |
| 24 - RP8 Contactor | System Fault | RP8 contactor command and feedback don't agree. Same as No. 10. | Decay Time 3600<br>Lock Limit 3<br>Accept Limit 10<br>#Window Limit 2 |
| 25 - RP9 Contactor | System Fault | RP9 contactor command and feedback don't agree. Some as No. 10. | Decay Time 3600<br>Lock Limit 3 |

-continued

TWO-DIGIT DISPLAY PANEL CODES

| EVENT DESCRIPTION | EVENT RESTRICTIONS (IF ANY) | DETECTION INFORMATION | EVENT VALUES |
|---|---|---|---|
| 26 - Forward Coil | System Fault | Forward position of reverser command and feedback don't agree. Same as No. 10. | Accept Limit 10 #Window Limit 2 Decay Time 3600 Lock Limit 3 |
| 27 - Reverser Coil | System Fault | Reverse position of reverser command and feedback don't agree. Same as No. 10. | Accept Limit 10 #Window Limit 2 Decay Time 3600 Lock Limit 3 |
| 28 - Forward/Reverse Call | System Fault | Forward and reverse direction both called for at the same time. | Accept Limit 10 #Window Limit 2 Decay Time 3600 Lock Limit 3 |
| 29 - ERC Relay | | Reserved for Series | Accept Limit #Window Limit 2 Decay Time Lock Limit |
| 30 - Digital/Analog Output Exceeds 10 v or 1 ma | Record In Memory Only | Software error; bad FB101 or 102 card. | Accept Limit #Window Limit Decay Time Lock Limit |
| 31 - Analog Readback | Record In Memory Only | Same as No. 30. | Accept Limit #Window Limit Decay Time Lock Limit |
| 32 - Digital/Analog Input Exceeds Maximum | Record In Memory Only | Same as No. 30. | Accept Limit #Window Limit Decay Time Lock Limit |
| 33 - Frequency Input | Record In Memory Only | Some as No. 30. | Accept Limit #Window Limit Decay Time Lock Limit |
| 34 - Frequency Hardware | Record In Memory Only | Same as No. 30. | Accept Limit #Window Limit Decay Time Lock Limit |
| 35 - Analog A to D | Record In Memory Only | Same as No. 30. RAM Battery Check | Accept Limit #Window Limit Decay Time Lock Limit |
| 37 - Startup (CPU) Fault | System Stop | May or may not inhibit propulsion, depending on the severity. Check sub-codes (Table 6) with PTU for more detail. Check for bad FB101 card. | Decay Time Lock Limit Accept Limit #Window Limit |
| 45 - Diode Fault | System Fault | Ripple current in alternator field circuit exceeds a preset value indicates shorted diodes in main rectifier. Check diodes, wiring between FDP and FL275 panel. Bed FDP, bad FB103 card. | Decay Time NA Lock Limit 1 Accept Limit 4 #Window Limit 2 |
| 46 - Motor 1 Overcurrent | System Fault | Current in motor 1 armature exceeds limits for a preset time. Limit is a function of being in retard or acceleration. | Decay Time 3600 Lock Limit 3 Accept Limit 10 #Window Limit 2 |
| 47 - Motor 2 Overcurrent | System Fault | Current in motor 2 armature exceeds limits for a preset time. Limit is a function of being in retard or acceleration. | Decay Time 3600 Lock Limit 3 Accept Limit 10 #Window Limit 2 |
| 48 - Motor Field Fault | System Fault | Motor field current not in correct proportion with motor armature current. Check for bad shunt, iso amp, wires, bad FB102 card. | Decay Time 3600 Lock Limit 3 Accept Limit 10 #Window Limit 2 |
| 49 - Motor Field Overcurrent | System Fault | Current in motor fields exceeds limits. Limit is a function of being in retard or acceleration. | Decay Time 3600 Lock Limit 3 Accept Limit 10 #Window Limit 2 |
| 50 - Motor Stall | System Fault (in Accel Only) | Motors stalled with motor current above 1000 amps, inverse time function. Could be caused by overloaded truck, grade or rolling resistance too high. Check for bad speed sensors, shunts, iso amps, wiring, bad FB102 card. | Decay Time 3600 Lock Limit 3 Accept Limit 10 #Window Limit 2 |
| 51 - Motor Spin | System Fault | One motor stuck, the other spinning for longer than 10 seconds (preset delay). Same as No. 50. | Decay Time 3600 Lock Limit 3 Accept Limit 10 #Window Limit 2 |

TWO-DIGIT DISPLAY PANEL CODES -continued

| EVENT DESCRIPTION | EVENT RESTRICTIONS (IF ANY) | DETECTION INFORMATION | EVENT VALUES |
|---|---|---|---|
| 52 - Alternator Tertiary Overcurrent | System Fault | Current in alternator field tertiary windings exceeds limits for a preset time. Check for shorted diodes or SCRs in AFSE. Check for low engine rpm. | Decay Time NA<br>Lock Limit 1<br>Accept Limit 4<br>#Window Limit 2 |
| 53 - Motor Tertiary Overcurrent | System Fault | Current in motor field tertiary windings exceeds limits for a preset time. Check for shorted diodes or SCRs in MFSE. Check for low engine rpm in Retard mode. | Decay Time NA<br>Lock Limit 1<br>Accept Limit 4<br>#Window Limit 2 |
| 54 - +15 Power | System Fault | Out Of Limit (±1 v) for 4 seconds. Check for battery volts below 20 v, excessive load on supply (iso Amp or VMM), bad FB100 card. | Decay Time 3600<br>Lock Limit 3<br>Accept Limit 10<br>#Window Limit 2 |
| 55 - −15 Power | System Fault | Out Of Limit (±1 v) for 4 seconds. Same as No. 54. | Decay Time 3600<br>Lock Limit 3<br>Accept Limit 10<br>#Window Limit 2 |
| 56 - +19 Power | System Fault | Out Of Limit (±3 v) for 4 seconds. Same as No. 54. | Decay Time 3600<br>Lock Limit 3<br>Accept Limit 10<br>#Window Limit 2 |
| 57 - Motor Polarity | System Fault | Motor 1 and Motor 2 opposite polarity. Check for loose wiring to shunts, cabling to motors or shunts, bad FB102 card. | Decay Time 3600<br>Lock Limit 3<br>Accept Limit 10<br>#Window Limit 2 |
| 58 - Grid Failure | System Fault | Retard Grid Circuit Failure. Check for loose cabling to grids. Check grids for foreign objects or physical damage. | Decay Time<br>Lock Limit<br>Accept Limit<br>#Window Limit |
| 59 - PTU Configuration | System Fault | PTU configuration inputs are inconsistent. | Decay Time NA<br>Lock Limit 1<br>Accept Limit 4<br>#Window Limit 2 |
| 60 - On Trolley | System Fault | Unable to complete the transition from diesel to trolley.<br>Not in use. | Decay Time NA<br>Lock Limit 1<br>Accept Limit 4<br>#Window Limit 2 |
| 61 - Off Trolley | System Fault | Unable to complete the transition from trolley to diesel.<br>Not in use. | Decay Time NA<br>Lock Limit 1<br>Accept Limit 4<br>#Window Limit 2 |
| 63 - Low Axle Box Pressure | If BPS does not pick up in 101 seconds, turn on light and buzzer. | Axle box air pressure not sensed with engine above 1550 rpm. Check for bad air ducts, open axle box door, bad axle box door gaskets, bad BPS switch, bad F8103 card. | Decay Time NA<br>Lock Limit NA<br>Accept Limit 10<br>#Window Limit 0 |
| 64 - Motor 1 Over Temperature | Turn On Light. | Motor 1 is over 220° C. temperature limit. Could be caused by load, duty or lack of sufficient cooling air. | Decay Time NA<br>Lock Limit NA<br>Accept Limit 10<br>#Window Limit 0 |
| 65 - Motor 2 Over Temperature | Turn On Light | Motor 2 is over 220° C. temperature limit. Could be caused by load, duty or lack of sufficient cooling air. | Decay Time NA<br>Lock Limit NA<br>Accept Limit 10<br>#Window Limit 0 |
| 66 - Overspeed | Apply maximum retard level to reduce speed below overspeed point. Turn an light. | Vehicle speed exceeds preset limit. | Decay Timse NA<br>Lock Limit NA<br>Accept Limit 50<br>#Window Limit 0 |
| 67 - Speed Retard | Record In Memory Only | Vehicle speed exceeds retard envelope. | Decay Time NA<br>Lock Limit NA<br>Accept Limit 10<br>#Window Limit 1 |
| 68 - Retard Over Current | Record in Memory Only | Retard current level exceeded. Check for bad shunt, iso amp or bad FB102 card. | Decay Time NA<br>Lock Limit NA<br>Accept Limit 25<br>#Window Limit 1 |
| 69 - Horsepower Low | Record In Memory Only | Engine is low on horsepower | Decay Limit NA<br>Lock Limit NA<br>Accept Limit 25<br>#Window Limit 1 |
| 70 - Horsepower Limit | Record In Memory Only | Engine horsepower limit is exceeded. | Decay Time NA<br>Lock Limit NA<br>Accept Limit 10<br>#Window Limit 1 |
| 71 - Engine Overspeed | Record In Memory Only | Engine speed is exceeded. | Decay Time NA<br>Lock Limit NA<br>Accept Limit 10<br>#Window Limit 1 |

-continued

| EVENT DESCRIPTION | TWO-DIGIT DISPLAY PANEL CODES | | |
|---|---|---|---|
| | EVENT RESTRICTIONS (IF ANY) | DETECTION INFORMATION | EVENT VALUES |
| 72 - Oil Pressure Warning | Record In Memory, Turn On ENG-MON Light. | Engine oil pressure in warning zone. Could be caused by an engine problem, bed sensor, bad FB102 card. | Decay Time NA<br>Lock Limit NA<br>Accept Limit 10<br>#Window Limit 1 |
| 73 - Oil Pressure Shutdown | Record In Memory. Turn On ENG-MON Light. | Engine oil pressure in shutdown zone. Same as No. 72. | Decay Time NA<br>Lock Limit NA<br>Accept Limit 10<br>#Window Limit 1 |
| 74 - Coolant Pressure Warning | Record In Memory. Turn On ENG-MON Light. | Engine coolant pressure in warning zone. Same as No. 72. | Decay Time NA<br>Lock Limit NA<br>Accept Limit 10<br>#Window Limit 1 |
| 75 - Coolant Pressure Shutdown | Record In Memory, Turn On ENG-MON Light. | Engine coolant pressure in shutdown zone. Same as No. 72. | Decay Time NA<br>Lock Limit NA<br>Accept Limit 10<br>#Window Limit 1 |
| 76 - Crankcase Overpressure | Record In Memory, Turn On ENG-MON Light. | Engine crankcase overpressure. Same as No. 72. | Decay Time NA<br>Lock Limit NA<br>Accept Limit 10<br>#Window Limit 1 |
| 77 - Coolant Oventemperature | Record In Memory, Turn On EN-GOVERTEMP Light. | Engine coolant temperature in warning zone. Same as No. 72. | Decay Time NA<br>Lock Limit NA<br>Accept Limit 10<br>#Window Limit 1 |
| 78 - Engine Service | Record In Memory. Turn On ENG-MON Light. | Engine warning. Service ASAP (Detroit Diesels with DDEC only.) | Decay Time NA<br>Lock Limit NA<br>Accept Limit 10<br>#Window Limit 1 |
| 79 - Engine Shutdown | Record In Memory, Turn On ENG-MON Light. | Engine shutdown ASAP (Detroit Diesels with DDEC only. It will inhibit propulsion after a 15 second delay and will continue to inhibit as long as the DDEC Engine Shutdown light is lit. | Decay Time NA<br>Lock Limit NA<br>Accept Limit 10<br>#Window Limit 1 |
| 80 - Engine Speed Retard | Record In Memory | Engine Speed less than 1500 rpm measured 4 seconds after high idle command when going into retard. Check engine control and DDEC. | Decay Time NA<br>Lock Limit NA<br>Accept Limit 10<br>#Window Limit 1 |
| 81 - Motor 1 Voltage Limit | Reduce alternator excitation such that voltage limit is not exceeded. | Motor 1 is over voltage limit. | Decay Time NA<br>Lock Limit NA<br>Accept Limit 10<br>#Window Limit 1 |
| 82 - Motor 2 Voltage Limit | Reduce alternator excitation such that voltage limit is not exceeded. | Motor 2 is over voltage limit. | Decay Time NA<br>Lock Limit NA<br>Accept Limit 10<br>#Window Limit 1 |
| 83 - Alternator Field Current Level | Record In Memory Only | Alternator field current is slow to decay. Check for bad shunt, iso amp, bad FB102 card. | Decay Time NA<br>Lock Limit NA<br>Accept Limit 10<br>#Window Limit 1 |
| 90 - Battery Low | Record In Memory Only | Battery volts low, less than 24 volts for 4 seconds and the engine speed is greater than 600 rpm. Check for bad battery charger or bad battery. | Decay Time NA<br>Lock Limit NA<br>Accept Limit 10<br>#Window Limit 1 |
| 91 - Battery High | Record In Memory Only | Battery volts high, greater then 32 volts for 4 seconds. Check for bad battery charger regulator. | Decay Time NA<br>Lock Limit NA<br>Accept Limit 10<br>#Window Limit 1 |
| 92 - Bad Engine Sensor | Record In Memory Only | Engine Sensor Output Outside Of Normal Range. Check for bad sensor wiring or bad sensor. | Decay Time<br>Lock Limit<br>Accept Limit<br>#Window Limit |
| 98 - Data Store | | Indicates that a data snap shot has been initiated by manual means. | Decay Time NA<br>Lock Limit NA<br>Accept Limit 50<br>#Window Limit 16 |
| 99 - Software | | Software problem. Reload software, reconfigure truck. Check for bad FB101 card. | Decay Time<br>Lock Limit<br>Accept Limit<br>#Window Limit |

NOTE:
The information listed under "EVENT VALUES" provides additional detail for each event, and is described as follows:
Decay Time = How long faults are held in memory (in seconds).
Lock Limit = Maximum number of resets allowed.
Acceptable Limit = Maximum number of events which can be recorded.
Window Limit = Number of events with 51 windows.

What is claimed is:

processing means including memory means for controlling the operation of the internal combustion engine and the electric generating means;

means for measuring the ambient temperature of the environment in which the vehicle is operating and generating a signal indicative of said measured ambient temperature and applying the same to said processing means;

means for measuring the output voltage of the electric generating means and generating a signal indicative of said measured output voltage and applying the same to said processing means;

means for measuring the output current of the electric generating means and generating a signal indicative of said measured output current and applying the same to said processing means;

said processing means being adapted to generate the control signals and apply the same to the electric generating means to increase the electric power provided at its output above the continuous rating and to generate and apply the control signals to the electric generating means to return the same to the continuous rating responsive to a calculated simulated temperature reaching the maximum predetermined operating temperature of the component of the electric generating means.

2. A system as defined in claim 1 wherein said simulated temperature is a function of the measured ambient temperature, the measured output voltage, the measured output current and predetermined physical characteristics of the electric generating means.

3. A system as defined in claim 2 wherein said electric generating means is an alternator adapted to convert the mechanical power of the engine to a three phase alternating current electrical output.

4. A system as defined in claim 3 wherein said component comprises a rotor of said alternator.

5. A system as defined in claim 4 wherein said predetermined physical characteristics comprise at least the heat storage capacity of said rotor of said alternator.

6. A system as defined in claim 4 wherein said predetermined physical characteristics comprise at least the resistance of said rotor of said alternator at a predetermined temperature.

7. A system as defined in claim 4 wherein said predetermined physical characteristics comprise at least the surface heat transfer coefficient of said rotor of said alternator.

8. A system as defined in claim 7 wherein said surface heat transfer coefficient varies in proportion to the speed at which the engine operates, said system having a plurality of coefficients stored in said memory means of said processing means corresponding to a plurality of preselected engine speeds.

9. A system as defined in claim 8 wherein three coefficients are stored in said memory means, said coefficients corresponding to a low idle speed, a high idle speed and a rated engine speed.

10. A system as defined in claim 1 wherein said processing means is adapted to generate said control signals on a periodic basis.

11. A system as defined in claim 10 wherein said processing means generates said control signals approximately every 5 seconds.

12. A system as defined in claim 1 wherein said electric generating means is adapted to vary the output voltage and output current to said traction motors to maintain a constant horsepower rating responsive to said control signals, said processing means being adapted to generate said control signals to said electric generating means to increase said output current and output voltage in proportion to maintain a constant horsepower rating when operating said electric generating means whereby the temperature of said component is above said first predetermined operating temperature.

13. A system as defined in claim 2 wherein said processing means calculates said simulated temperature by executing the equation:

$$T_{sim} = T^*\left(1 - \frac{H\Delta t}{C}\right) + \left(\frac{I_{AF}^2(234.5 + T_{amb} + T)}{259.5 * C}\right)$$

where
T = temperature rise of rotor (°C.),
$\Delta t$ = Time step,
H = Surface heat transfer coefficient (Watts/C),
C = Heat storage capacity (watt-sec./°C.),
R = Resistance of rotor (ohms),
I = RMS amps during $\Delta t$, and
$T_{amb}$ = Ambient temperature (°C).

14. An electrical propulsion system for a wheeled vehicle adapted to haul a payload, the vehicle having an internal combustion engine for powering the vehicle, said system comprising:

a plurality of adjustable speed electric traction motors mechanically coupled in driving relation to separate wheels on the vehicle, an electric alternator operatively connected to the engine and to said traction motors and providing electric power at its output for energizing said traction motors, said electric alternator being of the type which has a rotor and an output and which can be controlled to vary the voltage and current of the electric power provided at its output responsive to control signals being applied thereto and having a first predetermined operating temperature of said rotor thereof that correlates to a rating at which continuous operation can occur without substantial risk of damage thereto, and a maximum predetermined operating temperature higher than said first predetermined operating temperature of said rotor during which continuous operation would create a substantial risk of damage to said electric alternator, processing means including memory means for controlling the operation of the internal combustion engine and said electric alternator;

means for measuring the ambient temperature of the environment in which the vehicle is operating and generating a signal indicative of said measured ambient temperature and applying the same to said processing means;

means for measuring the output voltage of the electric alternator and generating a signal indicative of said measured output voltage and applying the same to said processing means;

means for measuring the output current of said electric alternator and generating a signal indicative of said measured output current and applying the same to said processing means;

said processing means being adapted to generate the control signals and apply the same to said electric alternator to increase the electric power provided at its output above the continuous rating and to generate and apply the control signals to said electric alternator to return the same to said continuous rating responsive to a calculated simulated temperature reaching the maximum predetermined operating temperature of said rotor of said electric alternator, said simulated temperature being a function of the measured ambient temperature, the measured output voltage, the measured output current and predetermined physical characteristics of said electric alternator.

15. A control system for an electrical propulsion system for a wheeled vehicle adapted to haul a payload, the vehicle being equipped with a plurality of adjustable speed electric traction motors mechanically coupled in driving relation to separate wheels on the vehicle, the vehicle having an internal combustion engine and an electric generating means operatively connected to the engine and to the traction motors and providing electric power at its output for energizing the traction motors, the electric generating means being of the type which can vary the voltage and current of the electric power provided at its output responsive to control signals being applied thereto, the engine having a predetermined nominal horsepower rating, said control system comprising:

processing means including memory means for controlling the operation of the internal combustion engine and the electric generating means;

means for measuring the operating speed of the engine and generating a signal indicative of said measured speed and applying the same to said processing means;

said processing means being adapted to generate the control signals and apply the same to the electric generating means to vary the electric power provided at its output and therefore vary the load being applied on the engine, said processing means being adapted to operate in one of at least two horsepower loading modes, one of said modes being a manual mode whereby the electric power provided at the output of said electric generating means is set to a predetermined value corresponding to the nominal horsepower rating of the engine, the other of said modes being an automatic mode whereby the electric power provided at the output of said electric generating means is set at a predetermined nominal value, said processing means being adapted to generate the control signals and apply the same to the electric generating means to increase the electric power provided at the output thereof above said predetermined nominal value up to a maximum variable level that is determined by said processing means receiving a signal from said measuring means indicative of said measured speed dropping below a predetermined speed.

16. A system as defined in claim 15 further comprising means for selecting one of said horsepower loading modes.

17. A system as defined in claim 15 wherein the electric generating means comprises an electrical alternator and the internal combustion engine comprises a diesel engine.

18. A control system for an electrical propulsion system for a wheeled vehicle adapted to haul a payload, the vehicle being equipped with a plurality of adjustable speed electric traction motors mechanically coupled in driving relation to separate wheels on the vehicle, the vehicle having an internal combustion engine with a nominal horsepower rating and an electric generating means operatively connected to the engine and to the traction motors and providing electric power at its output for energizing the traction motors, the electric generating means being of the type which can vary the voltage and current of the electric power provided at its output responsive to control signals being applied thereto, the electric generating means having a nominal output power level that loads the engine at its nominal horsepower rating, said control system comprising:

processing means including memory means for controlling the operation of the internal combustion engine and the electric generating means;

means for measuring the operating speed of the engine and generating a signal indicative of said measured speed and applying the same to said processing means;

said processing means being adapted to generate the control signals and apply the same to the electric generating means to vary the electric power provided at its output and therefore vary the load being applied on the engine, said processing means being adapted to generate the control signals and apply the same to the electric generating means to increase the electric power provided at the output thereof above said nominal output power level up to a maximum variable level that is determined by said processing means receiving the signal from said measuring means indicative of said measured operating speed of the engine dropping below a predetermined speed.

19. A system as defined in claim 18 wherein said processing means is adapted to selectively operate in one of at least first and second loading modes, said first mode being a manual mode whereby the electric power provided at the output of said electric generating means is set to said nominal output power level, said second mode being an automatic mode whereby the electric power provided at the output of said electric generating means is set at said nominal output power level, said processing means being adapted to generate the control signals and apply the same to the electric generating means to increase the electric power provided at the output thereof above said nominal output power level up to a maximum variable level that is determined by said processing means receiving the signal from said measuring means indicative of said measured operating speed of the engine dropping below said predetermined speed.

20. A method of operating an electrical propulsion system of a wheeled vehicle adapted to haul a payload, the vehicle being equipped with a plurality of adjustable speed electric traction motors mechanically coupled in driving relation to separate wheels on the vehicle, the vehicle having an internal combustion engine with a nominal horsepower rating, and an electric generating means operatively connected to the engine and to the traction motors and providing electric power at its output for energizing the traction motors, the electric generating means being of the type which can vary the voltage and current of the electric power provided at its output responsive to control signals being applied thereto, the system having processing means for controlling the operation of the internal combustion engine and the electric generating means, said processing means being adapted to generate the control signals and apply the same to the electric generating means to vary the electric power provided at its output and therefore vary the load being applied on the engine, and means for measuring the operating speed of the engine and generating a signal indicative of said measured speed and applying the same to said processing means, said method comprising the steps of:

generating the control signals and applying the same to the electric generating means to increase the load being applied on the engine;

generating the control signals and applying the same to the electric generating means to maintain the load being applied on the engine when the measured operating speed of the engine falls below a predetermined value.

21. A method of operating an electrical propulsion system for a wheeled vehicle which is adapted to haul a payload, the vehicle being equipped with a plurality of adjustable speed electric traction motors mechanically coupled in driving relation to separate wheels on the vehicle, the vehicle having a diesel engine with a nominal horsepower rating, and an electric alternator operatively connected to the engine and to the traction motors and providing electric power at its output for energizing the traction motors, the electric alternator being of the type which can vary the voltage and current of the electric power provided at its output responsive to control signals being applied thereto, the system having processing means for controlling the operation of the diesel engine and the electric alternator, said processing means being adapted to generate the control signals and apply the same to the electric alternator to vary the electric power provided at its output and therefore vary the load being applied on the engine, and means for measuring the operating speed of the engine and generating a signal indicative of said measured speed and applying the same to said processing means, said method comprising the steps of:

generating the control signals and applying the same to the electric alternator to operate the alternator at a predetermined alternator output that causes the engine to operate near its nominal horsepower rating;

measuring the operating speed of the engine and generating the control signals and applying the same to the electric alternator to increase the load being applied to the engine until the measured operating speed of the engine falls below a predetermined value; and, generating the control signals and applying the same to the electric alternator to operate the alternator at an alternator output level that causes the engine to operate at least at said predetermined value of operating speed.

22. A control system for an electrical propulsion system for a wheeled vehicle adapted to haul a payload, the vehicle being equipped with a plurality of adjustable speed electric traction motors mechanically coupled in driving relation to separate wheels on the vehicle, the vehicle having an internal combustion engine and an electric generating means operatively connected to the engine and to the traction motors and providing electric power at its output for energizing the traction motors, the electric generating means being of the type which can vary the voltage and current of the electric power provided at its output responsive to control signals being applied thereto and having a first predetermined operating temperature of a component thereof that correlates to a rating at which continuous operation can occur without substantial risk of damage thereto, and a maximum predetermined operating temperature higher than the first predetermined operating temperature of the component during which continuous operation would create a substantial risk of damage to the electric generating means, said control system comprising:

processing means including memory means for controlling the operation of the internal combustion engine and the electric generating means, said processing means including time and calendar means for providing time and date stamps for selective signals that are received by said processing means;

means for measuring preselected electrical parameters of the electric generating means and generating electrical signals respectively indicative of said measured electrical parameters and applying the same to said processing means;

means for measuring preselected mechanical and operating parameters of the engine and generating electrical signals respectively indicative of said measured mechanical and operating parameters and applying the same to said processing means;

means for measuring preselected mechanical and operating parameters of the vehicle and generating electrical signals respectively indicative of said measured mechanical and operating parameters and applying the same to said processing means;

said processing means being adapted to receive said electrical signals from each of said measuring means and write selective historical data in said memory means relating to the history of operation of the vehicle, the electric generating means and the engine.

23. A system as defined in claim 22 wherein said processing means writes said historical data in said memory means and maintains said data for predetermined periods of time.

24. A system as defined in claim 23 wherein said historical data provides a daily record of selective mechanical, electrical and operating parameters.

25. A system as defined in claim 23 wherein said historical data provides a record of selective mechanical, electrical and operating parameters for a predetermined number of quarters of a year.

26. A system as defined in claim 23 wherein said historical data includes data indicating the time duration of selected operating parameters of the vehicle.

27. A system as defined in claim 23 wherein said historical data includes data comprising the cumulative total of selected operating parameters.

28. A system as defined in claim 26 wherein said historical data includes data that indicates the time duration of operation of the engine, operation of the vehicle, operation of the electric generating means, and operation of the vehicle above a predetermined speed.

29. A system as defined in claim 22 including display means operatively connected to said processing means, said display means having a multiple digit readout, said processing means being adapted to generate electrical signals to said display means for providing selected visual indications of a plurality of operational parameters relating to the vehicle and said system.

30. A system as defined in claim 29 wherein said display means is adapted to display a plurality of two digit codes, each of which indicates a status condition relating to the operation of the vehicle and the system.

31. A system as defined in claim 30 wherein a description of troubleshooting techniques is associated with each of said plurality of two digit codes.

32. A system as defined in claim 31 wherein said description of troubleshooting techniques is accessed via an operator input means associated with said display means.

33. A control system for an electrical propulsion system for a wheeled vehicle adapted to haul a payload, the vehicle being equipped with a plurality of adjustable speed electric traction motors mechanically coupled in driving relation to separate wheels on the vehicle, the vehicle having an internal combustion engine and an electric generating means operatively connected to the engine and to the traction motors and providing electric power at its output for energizing the traction motors, said control system comprising:

processing means including memory means for controlling the operation of the internal combustion engine and the electric generating means, said processing means including time and calendar means for providing time and date stamps for selective signals that are received by said processing means, and to determine preselected fault conditions in response to receiving signals indicative of preselected mechanical and electrical parameters that are outside of predetermined limits;

means for measuring preselected electrical parameters of the electric generating means and generating electrical signals respectively indicative of said measured electrical parameters and applying the same to said processing means;

means for measuring preselected mechanical and operating parameters of the engine and generating electrical signals respectively indicative of said measured mechanical and operating parameters and applying the same to said processing means;

means for measuring preselected mechanical and operating parameters of the vehicle and generating electrical signals respectively indicative of said measured mechanical and operating parameters and applying the same to said processing means;

override switch means operatively connected to said processing means, and adapted to override a fault condition responsive to actuation thereof in the absence of an inhibiting condition being established by said processing means;

said processing means being adapted to receive said electrical signals from each of said measuring means and determine a fault condition and write data indicative of said fault condition in said memory means, said processing means stopping the vehicle in response to the fault condition being determined.

34. A system as defined in claim 33 further including display means operatively connected to said processing means, said display means having a multiple digital readout, said processing means being adapted to generate electrical signals to said display means for providing selected visual indications of a plurality of operational parameters relating to the vehicle and said system, including preselected fault conditions.

35. A system as defined in claim 34 wherein said display means comprises at least one logic screen for providing troubleshooting aid.

36. A system as defined in claim 35 wherein said at least one logic screen for providing troubleshooting aid comprises two logic screens.

37. A system as defined in claim 35 wherein said at least one logic screen contains ladder diagrams to allow a determination of which signal is preventing the control system from achieving an acceleration or a retard state.

38. A system as defined in claim 37 wherein said ladder diagrams comprise operator inputs and propulsion system feedbacks.

39. A system as defined in claim 33 wherein said processing means selectively includes a predetermined override limit for preselected fault conditions, said processing means generating said inhibiting condition in response to said limit being reached.

40. A system as defined in claim 34 wherein said display means includes a reset means which when actuated, clears said visual indications therefrom, said electrical signals of said operational parameters and said preselected fault conditions being written in said memory means of said processing means.

41. A system as defined in claim 33 wherein said processing means includes means for establishing a predetermined rate at which said processing means writes into said memory means the electrical signals generated from each of said measuring means, said predetermined rate being adjustable.

42. A system as defined in claim 33 further including a snapshot switching means operatively connected to said processing means, said snapshot switching means being adapted to write into said memory means the electrical signals generated from each of said measuring means in response to actuation of said snapshot switching means.

* * * * *